(12) United States Patent
Apps et al.

(10) Patent No.: US 7,861,458 B2
(45) Date of Patent: Jan. 4, 2011

(54) COLLAPSIBLE CONTAINER

(75) Inventors: William P. Apps, Alpharetta, GA (US); Jon P. Hassell, Atlanta, GA (US); Sean T. Ogburn, Hoschton, GA (US)

(73) Assignee: Rehrig Pacific Company, Los Angeles, CA (US)

( * ) Notice: Subject to any disclaimer, the term of this patent is extended or adjusted under 35 U.S.C. 154(b) by 18 days.

(21) Appl. No.: 11/956,010

(22) Filed: Dec. 13, 2007

(65) Prior Publication Data

US 2009/0151226 A1    Jun. 18, 2009

(51) Int. Cl.
*A01K 69/10* (2006.01)

(52) U.S. Cl. .................. 43/105; 43/100; 119/474; 220/4.28; 220/434; 220/6; 220/7; 220/254.1; 220/254.7; 220/603; 220/810; 220/836; 220/840; 248/910

(58) Field of Classification Search .......... 43/105, 43/100, 55; 220/4.28, 4.29, 4.34, 6, 7, 254.1, 220/254.3, 254.4, 254.5, 254.7, 603, 908, 220/810, 836, 840, 841; 248/346.2, 364, 248/907, 910; 119/474
See application file for complete search history.

(56) References Cited

U.S. PATENT DOCUMENTS

| | | | | |
|---|---|---|---|---|
| 611,753 | A * | 10/1898 | Hoskins | 43/55 |
| 785,451 | A * | 3/1905 | Tourville | 43/55 |
| 882,184 | A * | 3/1908 | Willard et al. | 43/55 |
| 1,242,160 | A * | 10/1917 | Eger et al. | 220/7 |
| 1,330,338 | A * | 2/1920 | Peavy | 43/61 |
| 1,356,400 | A * | 10/1920 | Parr | 43/55 |
| 1,389,199 | A * | 8/1921 | Lee | 119/474 |
| 1,407,054 | A * | 2/1922 | Farley | 220/6 |
| 1,446,612 | A * | 2/1923 | Brenneman | 43/55 |
| 1,670,525 | A * | 5/1928 | Savery | 220/603 |
| 1,809,523 | A * | 6/1931 | McLean | 220/7 |
| 1,869,071 | A * | 7/1932 | McLean | 43/55 |
| 1,973,952 | A * | 9/1934 | Golberg | 119/474 |
| 2,007,296 | A * | 7/1935 | Crawford | 43/55 |
| 2,123,471 | A * | 7/1938 | Lewis | 43/100 |
| 2,149,482 | A * | 3/1939 | Whitaker | 43/55 |
| 2,456,419 | A * | 12/1948 | Jackson et al. | 220/6 |
| 2,462,693 | A * | 2/1949 | Wabshaw | 206/505 |
| 2,497,453 | A * | 2/1950 | Adelbert | 220/4.31 |
| 2,530,148 | A * | 11/1950 | Bjorklund et al. | 43/55 |
| 2,553,273 | A * | 5/1951 | Phillips | 220/6 |
| 2,560,089 | A * | 7/1951 | Cottingham | 220/7 |
| 2,579,655 | A * | 12/1951 | Donald | 220/6 |
| 2,646,187 | A * | 7/1953 | Roop | 220/836 |
| 2,667,398 | A * | 1/1954 | Claflin | 43/55 |

(Continued)

FOREIGN PATENT DOCUMENTS

EP    1849356 A1  * 10/2007

(Continued)

*Primary Examiner*—Darren W Ark
(74) *Attorney, Agent, or Firm*—Carlson, Gaskey & Olds

(57) ABSTRACT

A collapsible container includes a base, at least one side wall and at least one end wall extending from the base, a top ring and a lid. The top ring is positioned on the side wall and the end wall on an opposite side from the base. The lid is hingedly attached to the top ring. The side wall and end wall are pivotable between a collapsed position and a use position relative to the base.

34 Claims, 18 Drawing Sheets

U.S. PATENT DOCUMENTS

| | | | | |
|---|---|---|---|---|
| 2,714,466 A * | 8/1955 | Killeen | | 220/7 |
| 2,726,478 A * | 12/1955 | Pullen | | 43/100 |
| 2,731,761 A * | 1/1956 | Marshall | | 43/100 |
| 2,759,622 A * | 8/1956 | Simmons et al. | | 220/4.28 |
| 2,785,822 A * | 3/1957 | Kus | | 220/4.28 |
| 2,797,524 A * | 7/1957 | Nelson | | 43/55 |
| 2,803,084 A * | 8/1957 | Frerking | | 43/55 |
| 2,847,794 A * | 8/1958 | Loud et al. | | 43/55 |
| 2,849,828 A * | 9/1958 | Johnson | | 43/55 |
| 2,868,406 A * | 1/1959 | Kookogey | | 220/7 |
| 2,963,192 A * | 12/1960 | Gunnar | | 220/6 |
| 2,965,259 A * | 12/1960 | Johnson | | 220/6 |
| 3,095,965 A * | 7/1963 | Gerald et al. | | 220/836 |
| 3,311,254 A * | 3/1967 | Beh | | 220/6 |
| 3,342,190 A * | 9/1967 | Hultgren et al. | | 220/840 |
| 3,360,180 A * | 12/1967 | Venturi | | 220/7 |
| 3,374,770 A * | 3/1968 | Freudenberger | | 43/55 |
| 3,394,832 A * | 7/1968 | McAllister et al. | | 220/908 |
| 3,446,415 A * | 5/1969 | Bromley | | 220/7 |
| 3,471,114 A * | 10/1969 | Ball | | 248/346.2 |
| 3,497,127 A * | 2/1970 | Box | | 220/7 |
| 3,516,592 A * | 6/1970 | Friedrich | | 220/7 |
| 3,605,718 A * | 9/1971 | Winters | | 220/836 |
| 3,747,794 A * | 7/1973 | Bitney | | 220/7 |
| 3,782,579 A * | 1/1974 | Zarges | | 220/6 |
| 3,804,033 A * | 4/1974 | Izawa et al. | | 108/53.5 |
| 3,814,220 A * | 6/1974 | Brody | | 220/6 |
| 3,821,861 A * | 7/1974 | Jalbert | | 43/100 |
| 3,874,546 A * | 4/1975 | Sanders et al. | | 220/7 |
| 3,906,655 A * | 9/1975 | Lowenthal, Jr. | | 43/105 |
| 3,950,885 A * | 4/1976 | Simeti | | 43/105 |
| 3,992,804 A * | 11/1976 | Senese | | 43/100 |
| 3,995,764 A * | 12/1976 | Zagami | | 220/908 |
| 4,030,232 A * | 6/1977 | Niva | | 43/105 |
| 4,034,693 A * | 7/1977 | Challenger | | 43/100 |
| 4,062,467 A * | 12/1977 | Friedrich | | 220/7 |
| 4,159,591 A * | 7/1979 | Plante | | 43/100 |
| 4,163,495 A * | 8/1979 | Drader | | 220/6 |
| 4,186,841 A * | 2/1980 | Buckley et al. | | 220/6 |
| 4,192,430 A * | 3/1980 | Cornou | | 220/812 |
| 4,195,436 A * | 4/1980 | Moure | | 43/100 |
| 4,221,070 A * | 9/1980 | Swindell | | 43/100 |
| 4,221,071 A * | 9/1980 | Sjolund | | 43/100 |
| 4,237,646 A * | 12/1980 | Mims, III | | 43/105 |
| 4,280,676 A * | 7/1981 | Betts | | 220/908 |
| 4,409,752 A * | 10/1983 | Anderson | | 43/105 |
| 4,438,606 A * | 3/1984 | Chardon et al. | | 220/603 |
| 4,450,788 A * | 5/1984 | Niki | | 119/477 |
| 4,486,973 A * | 12/1984 | Faucillon | | 43/105 |
| 4,572,400 A * | 2/1986 | Sosa | | 220/908 |
| 4,618,068 A * | 10/1986 | Born | | 220/4.28 |
| 4,648,199 A * | 3/1987 | Deaton et al. | | 43/105 |
| 4,648,200 A * | 3/1987 | Miller et al. | | 43/105 |
| 4,662,532 A * | 5/1987 | Anderson et al. | | 220/7 |
| 4,674,647 A * | 6/1987 | Gyenge et al. | | 220/6 |
| 4,693,392 A * | 9/1987 | Contreras, Sr. | | 220/827 |
| 4,720,020 A * | 1/1988 | Su | | 220/6 |
| 4,735,331 A * | 4/1988 | Keenan et al. | | 220/6 |
| 4,741,032 A * | 4/1988 | Hampton | | 220/836 |
| 4,746,031 A * | 5/1988 | Grandmottet | | 220/836 |
| 4,759,149 A * | 7/1988 | Dunn | | 43/102 |
| 4,798,304 A * | 1/1989 | Rader | | 220/6 |
| 4,807,774 A * | 2/1989 | Karpisek | | 220/6 |
| 4,864,770 A * | 9/1989 | Serio | | 43/105 |
| 4,905,945 A * | 3/1990 | Peterson | | 220/603 |
| 4,909,188 A * | 3/1990 | Tominaga | | 119/474 |
| 5,022,529 A * | 6/1991 | Kang | | 220/836 |
| 5,038,953 A * | 8/1991 | Radar | | 220/6 |
| 5,056,667 A * | 10/1991 | Coogan | | 220/7 |
| 5,094,356 A * | 3/1992 | Miller | | 220/7 |
| 5,109,980 A * | 5/1992 | Matsuoka et al. | | 220/840 |
| 5,142,814 A * | 9/1992 | Guidry | | 43/105 |
| 5,172,808 A * | 12/1992 | Bruno | | 220/603 |
| 5,183,175 A * | 2/1993 | Brown | | 220/908 |
| 5,259,809 A * | 11/1993 | Rainey, Jr. | | 43/100 |
| 5,331,763 A * | 7/1994 | Miller | | 43/105 |
| 5,357,708 A * | 10/1994 | Peters et al. | | 43/100 |
| 5,398,835 A * | 3/1995 | Blinstrub | | 220/7 |
| 5,474,199 A * | 12/1995 | Julius et al. | | 220/837 |
| 5,482,172 A * | 1/1996 | Braddock | | 220/254.3 |
| 5,501,354 A * | 3/1996 | Stromberg | | 220/7 |
| 5,566,499 A * | 10/1996 | Washecka | | 43/105 |
| 5,577,628 A * | 11/1996 | O'Neil et al. | | 220/840 |
| 5,595,305 A * | 1/1997 | Hart | | 220/4.29 |
| 5,632,114 A * | 5/1997 | McKenzie | | 43/105 |
| 5,769,260 A * | 6/1998 | Killinger et al. | | 220/836 |
| 5,829,617 A * | 11/1998 | Umiker | | 220/6 |
| 5,839,220 A * | 11/1998 | Wass | | 43/105 |
| 5,938,059 A * | 8/1999 | Luburic | | 220/6 |
| 5,946,850 A * | 9/1999 | Sarkisyan | | 43/100 |
| 5,975,346 A * | 11/1999 | Imperato et al. | | 220/840 |
| 6,056,177 A * | 5/2000 | Schneider | | 220/6 |
| 6,131,757 A * | 10/2000 | Clark et al. | | 220/7 |
| 6,138,863 A * | 10/2000 | Aiken | | 220/836 |
| 6,237,765 B1 * | 5/2001 | Hagen et al. | | 43/55 |
| 6,267,079 B1 * | 7/2001 | Eby | | 43/100 |
| 6,401,953 B2 * | 6/2002 | Kofod | | 220/7 |
| 6,415,938 B1 * | 7/2002 | Karpisek | | 220/6 |
| 6,644,493 B1 * | 11/2003 | Walton et al. | | 220/603 |
| 6,739,474 B1 * | 5/2004 | Wang | | 220/810 |
| 6,772,899 B2 * | 8/2004 | Delmon | | 220/836 |
| 6,820,761 B1 * | 11/2004 | Mouri et al. | | 220/6 |
| 7,014,059 B2 * | 3/2006 | Reynolds | | 220/908 |
| 7,021,483 B2 * | 4/2006 | Tack et al. | | 220/254.1 |
| 7,108,447 B2 * | 9/2006 | Akkala et al. | | 220/810 |
| 7,258,255 B2 * | 8/2007 | Vogel et al. | | 220/254.3 |
| 7,264,133 B2 * | 9/2007 | Yang et al. | | 220/908 |
| 7,273,155 B1 * | 9/2007 | Gray | | 220/908 |
| 7,290,663 B2 * | 11/2007 | Deng et al. | | 220/6 |
| 7,296,704 B2 * | 11/2007 | Ferrini | | 220/6 |
| 7,313,887 B2 * | 1/2008 | Hibbs et al. | | 43/105 |
| 7,353,962 B2 * | 4/2008 | Parnall et al. | | 220/6 |
| 7,357,269 B2 * | 4/2008 | Apps | | 220/7 |
| 7,416,092 B2 * | 8/2008 | Dubois et al. | | 220/6 |
| 7,475,788 B2 * | 1/2009 | Schwarz | | 220/254.3 |
| 7,494,021 B2 * | 2/2009 | Yang et al. | | 220/908 |
| 7,533,486 B2 * | 5/2009 | Ribeiro De Matos | | 43/105 |
| 7,562,491 B1 * | 7/2009 | Lueck | | 43/55 |
| 7,717,283 B2 * | 5/2010 | Apps et al. | | 220/6 |
| 7,726,502 B2 * | 6/2010 | Apps | | 220/6 |
| 7,740,146 B2 * | 6/2010 | Cavalcante et al. | | 220/6 |
| 2005/0016999 A1 * | 1/2005 | Richardson et al. | | 220/4.28 |
| 2005/0139598 A1 * | 6/2005 | Tack et al. | | 220/254.3 |
| 2005/0229477 A1 * | 10/2005 | Gomez | | 43/100 |
| 2006/0076352 A1 * | 4/2006 | Peterson et al. | | 220/254.3 |
| 2006/0236612 A1 * | 10/2006 | Sheng et al. | | 220/810 |
| 2007/0251138 A1 * | 11/2007 | Ribeiro De Matos | | 43/105 |
| 2007/0278223 A1 * | 12/2007 | Ficker | | 220/6 |
| 2008/0092432 A1 * | 4/2008 | Philbrook | | 43/100 |
| 2008/0142399 A1 * | 6/2008 | Apps | | 220/6 |
| 2008/0169285 A1 * | 7/2008 | Marazita et al. | | 220/7 |
| 2008/0179322 A1 * | 7/2008 | Parnall et al. | | 220/6 |
| 2008/0272542 A1 * | 11/2008 | Norman | | 220/810 |

FOREIGN PATENT DOCUMENTS

| | | | |
|---|---|---|---|
| GB | 2382970 A * | 6/2003 | |
| GB | 2388509 A * | 11/2003 | |
| GB | 2396092 A * | 6/2004 | |
| JP | 2006197801 A * | 8/2006 | |
| JP | 2007295924 A * | 11/2007 | |
| WO | WO 2006064293 A1 * | 6/2006 | |

* cited by examiner

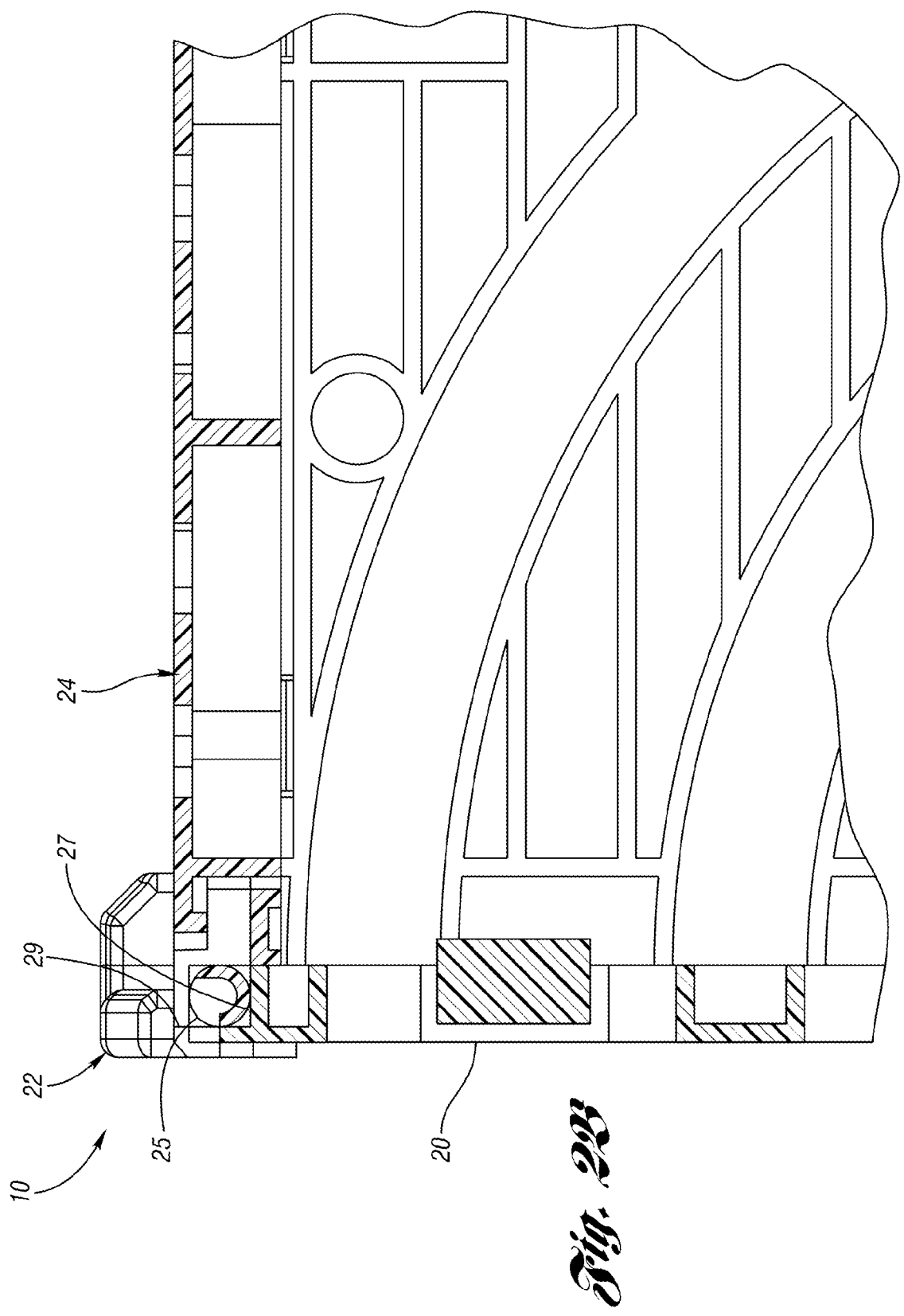

COLLAPSIBLE CONTAINER

BACKGROUND OF THE INVENTION

The present application relates generally to a collapsible container, which can be used, for example, as a collapsible crustacean trap for trapping marine animals.

Crustacean traps are known and typically include a tunnel opening that provides crustaceans with entry into and restricted exit from the trap's interior. Traditional crustacean traps include a metal frame covered by a wire mesh. The crustacean traps are taken out to sea, lowered to the ocean floor, and their location is marked with a floating buoy for later retrieval. The trap is left submerged in the ocean to accumulate crustaceans. The crustacean fisherman returns after a period of time, such as a couple of days, locates the buoy that marks the crustacean traps location, and hoists the trap aboard to retrieve the catch. Crustacean traps of this type are susceptible to damage due to deterioration of the metal frame and wire mesh caused by rot, corrosive action of sea water and structural stresses experienced by the traps during deployment, retrieval and storage.

Plastic crustacean traps are also known. These plastic crustacean traps are shipped in pieces which must be assembled by the fisherman. The assembled traps do not include a floor, which is then formed by pouring concrete into the container. These traps had several drawbacks. First, the assembly of the trap was too time-consuming and difficult, especially when several had to be assembled. Second, the connections between the walls were not sufficient for the trap (with its concrete base) to be pulled out of the ocean by one of the walls. Also, the concrete sometimes separated from the walls when lifting the trap out of the ocean.

SUMMARY OF THE INVENTION

A collapsible container includes a base, at least one side wall and at least one end wall extending from the base, a top ring and a lid. The top ring is positioned on the side wall and the end wall on an opposite side from the base. The lid is hingeably attached to the top ring. The top ring is removable. The side wall and end wall are pivotable between a collapsed position and a use position relative to the base.

If utilized as a crustacean trap, the container may include a weighted member positioned within an interior of the container body and extending from the base in a direction towards the lid. In the disclosed embodiment, the weighted member is concrete poured onto the base after assembly. The concrete provides weight to the container to keep it submerged and provides structural reinforcement that strengthens the connection of the sidewalls to the base.

A method of utilizing a collapsible crustacean trap to trap a crustacean includes shipping the collapsible crustacean trap in a collapsed position, positioning the collapsible crustacean trap in a use position, adding a weighted member to a portion of the collapsible crustacean trap, and lowering the collapsible crustacean trap into a body of water.

The various features and advantages of this invention will become apparent to those skilled in the art from the following detailed description. The drawings that accompany the detailed description can be briefly described as follows.

BRIEF DESCRIPTION OF THE DRAWINGS

FIG. 2B is a section view through the hinge of the container;

FIG. 2C is a perspective view of the trap of FIG. 1 with the lid completely open;

FIG. 2D is a perspective view of the base, one side wall and one end wall of FIG. 1;

DETAILED DESCRIPTION OF THE DISCLOSED EMBODIMENT

Figure 1:
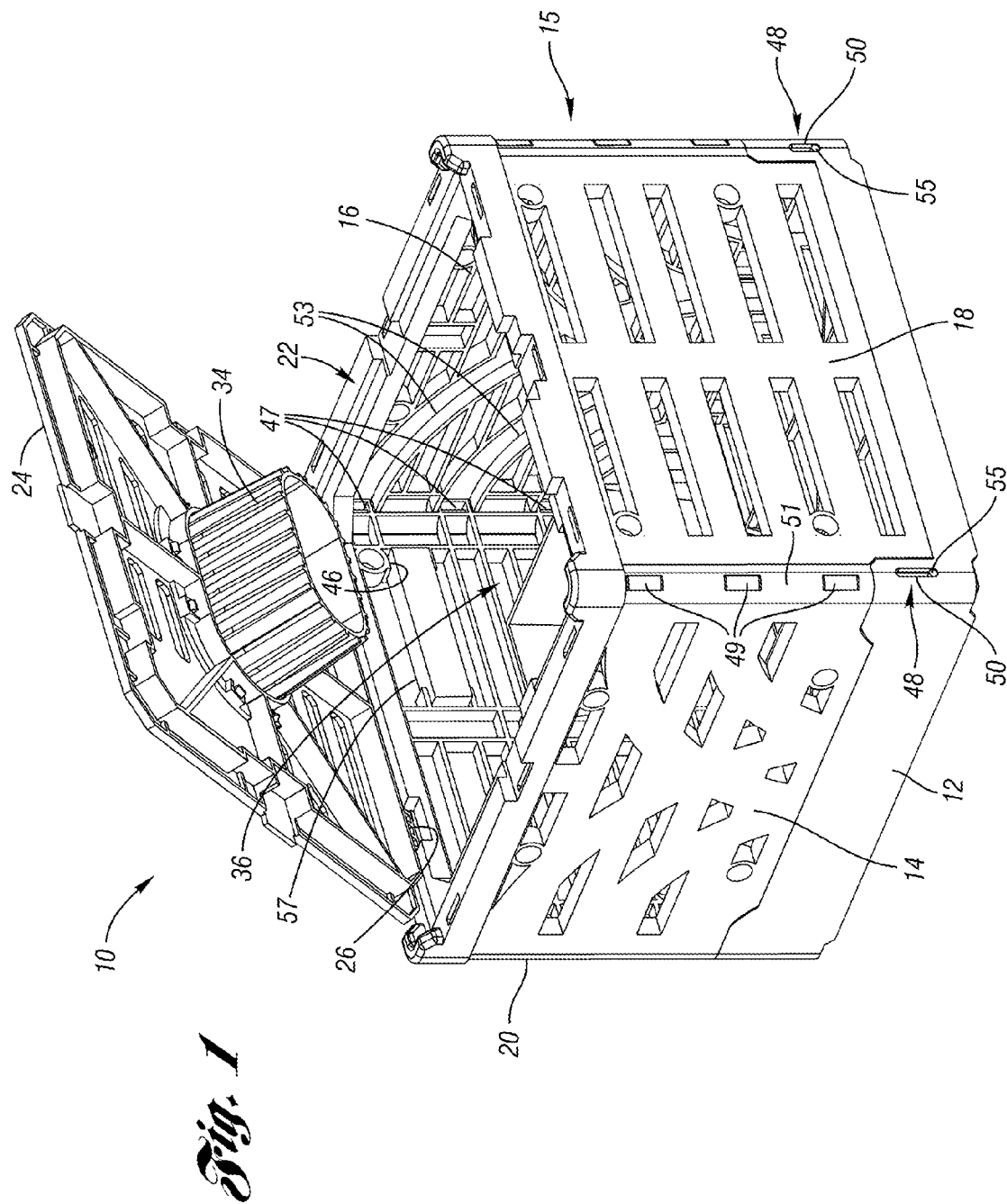
FIG. 1 illustrates a perspective view of an example collapsible container configured as a crustacean trap, with the lid partially open.
Figure 2:
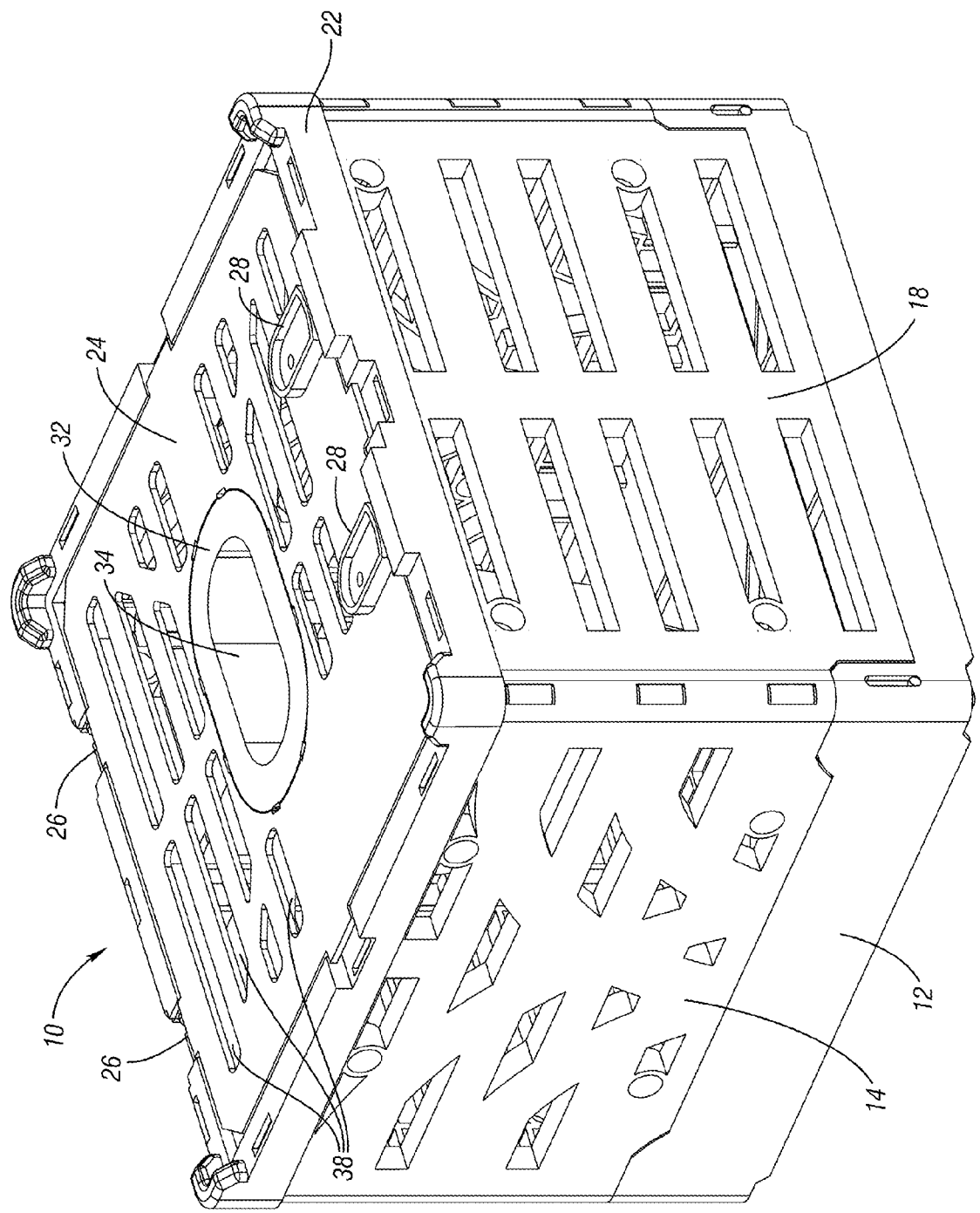
FIG. 2 illustrates a second perspective view of the collapsible container illustrated in FIG. 1, with the lid closed.

FIGS. 1 and 2 illustrate a collapsible container 10 configured for trapping crustaceans, including but not limited to, crabs, lobsters, crawfish, etc. The container 10 could also be utilized to trap other types of marine animals, or other animals, or could be configured for some use other than as a trap. The container 10 includes a base 12, opposing side walls 14, 16 and opposing end walls 18, 20, that extend from the base 12, and a top ring 22 disposed on upper ends of the side walls 14, 16 and end walls 18, 20. The base 12, the side walls 14, 16 and the end walls 18, 20 form a trap body 15. The example container 10 is collapsible, as is further discussed below. The container 10 components can be injection molded from a thermoplastic material, for example.

Each end wall 18, 20 includes a plurality of tongues 47 positioned at each side of the end walls 18, 20. The tongues 47 are partially received within openings 49 of flanges 51 of the side walls 14, 16 to assemble the trap body 15 in the use position. The tongues 47 are also slideable within corresponding arched grooves 53 of the side walls 14, 16 and travel within these grooves 53 during assembly as the end walls 18, 20 are moved between the collapsed position and the use position.

Each side wall 14, 16 includes a pair of translating hinge arrangements 48 (one on each side of side walls 14, 16) that are vertically translatable within a slot 50 formed in the base 12. Each translating hinge arrangement 48 includes a hinge pin 55 that protrudes from the side wall 14 and extends through the slot 50. The translating hinge arrangements 48 allow the side walls 14, 16 to collapse flat onto the end walls 18, 20 while also permitting the side walls 14, 16 to extend as far as possible into the base 12 when erected.

The top ring 22 has a lid 24 pivotably attached thereto by a hinge 26. In one example, the lid 24 is pivotably mounted to the top ring 22 by a pair of axially aligned hinges 26. The top ring 22 is snap-fit to the upper ends of the side walls 14, 16 and end walls 18, 20. The top ring 22 provides reinforcement to the upper half of the container 10, which experiences high levels of force during retrieval from the ocean, while still providing a very large opening to the container 10 when the lid 24 is opened.

The lid 24 includes an opening 32 having a tunnel portion 34 that extends transversely from the lid 24. In the example shown, the tunnel portion 34 extends toward an interior 36 defined by the container 10. The tunnel portion 34 may be snap-fit to the lid 24, or otherwise connectable by the end user to the lid 24.

The opening 32 permits crustaceans to enter the container 10, and prevents the crustaceans from egress from the container 10. The positioning of the opening 32 spaced substantially apart from the side walls 14, 16 and the end walls 18, 20 minimizes the ability of a crustacean to crawl along the interior surfaces of the side walls 14, 16 and the end walls 18, 20 to gain egress from the container 10 via the opening 32. In addition, the lid 24 includes a plurality of holes 38 that permit the passage of light and water through the lid 24 and into the interior 36 defined by the container 10.

Figure 3:
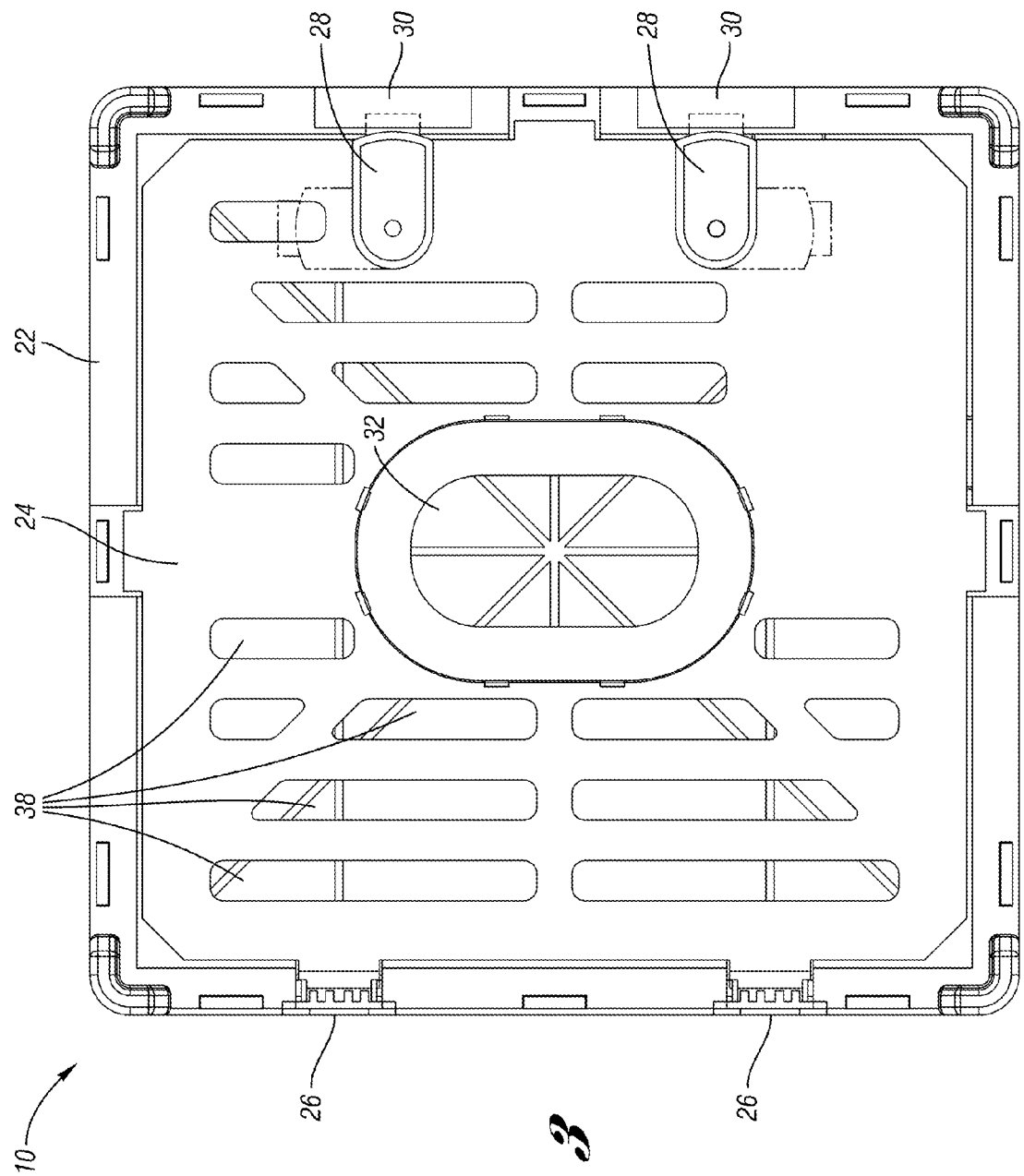
FIG. 3 illustrates a top view of the collapsible container illustrated in FIG. 2.

Referring to FIG. 2, the lid 24 also includes latches 28 for securing the lid 24 to the top ring 22. In this example, the lid 24 includes a pair of latches 28. However, it should be understood that the lid 24 may include any number of latches and any type of latch. The latches 28 are rotatable between a locked position (solid lines in FIGS. 2 and 3) and an unlocked position (shown in phantom lines in FIG. 3). In the locked position, the latches 28 are partially received within notches 30 formed by the top ring 22 (See FIG. 3).

Figure 2A:
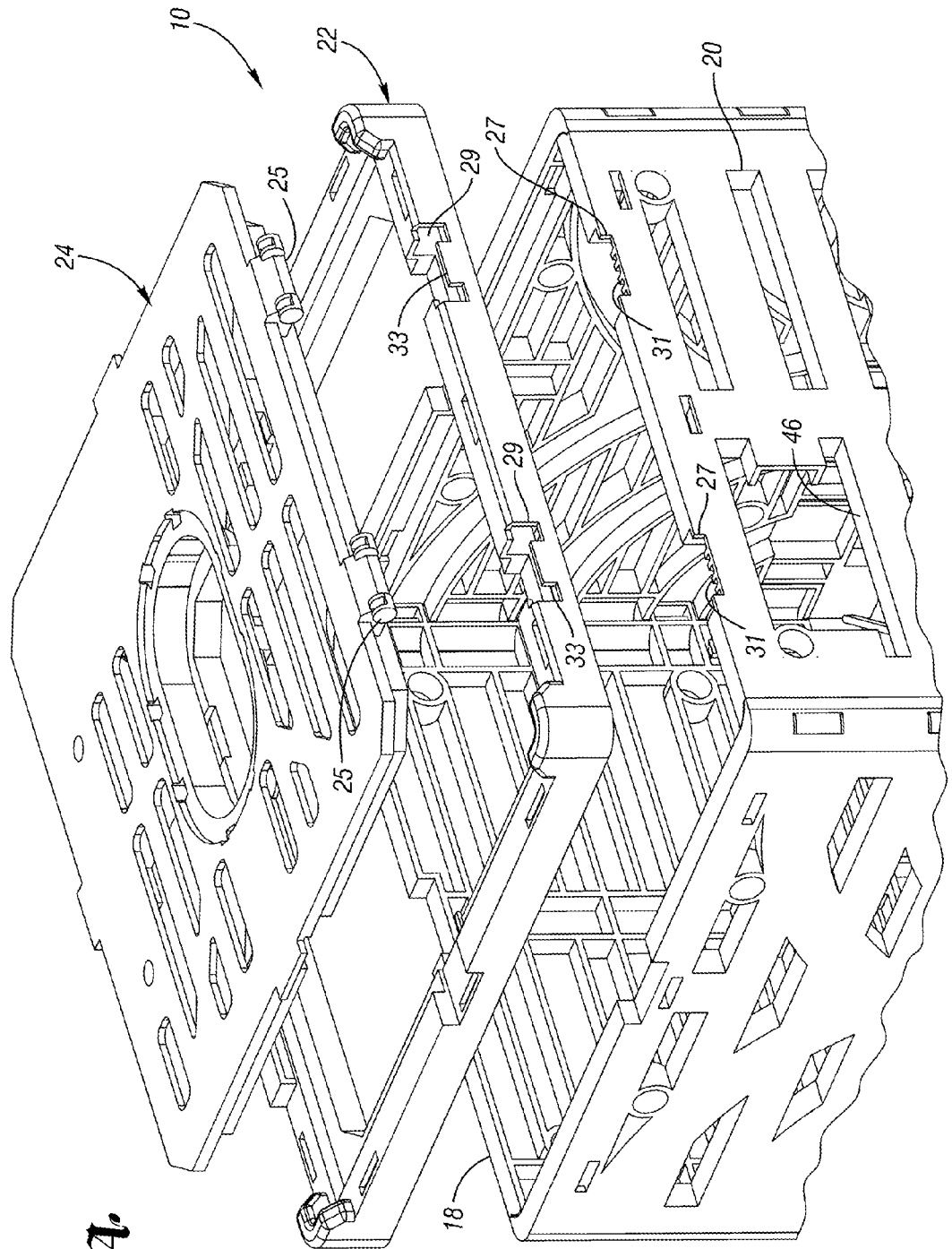
FIG. 2A is an exploded view of the trap of FIG. 1.
Figure 26:
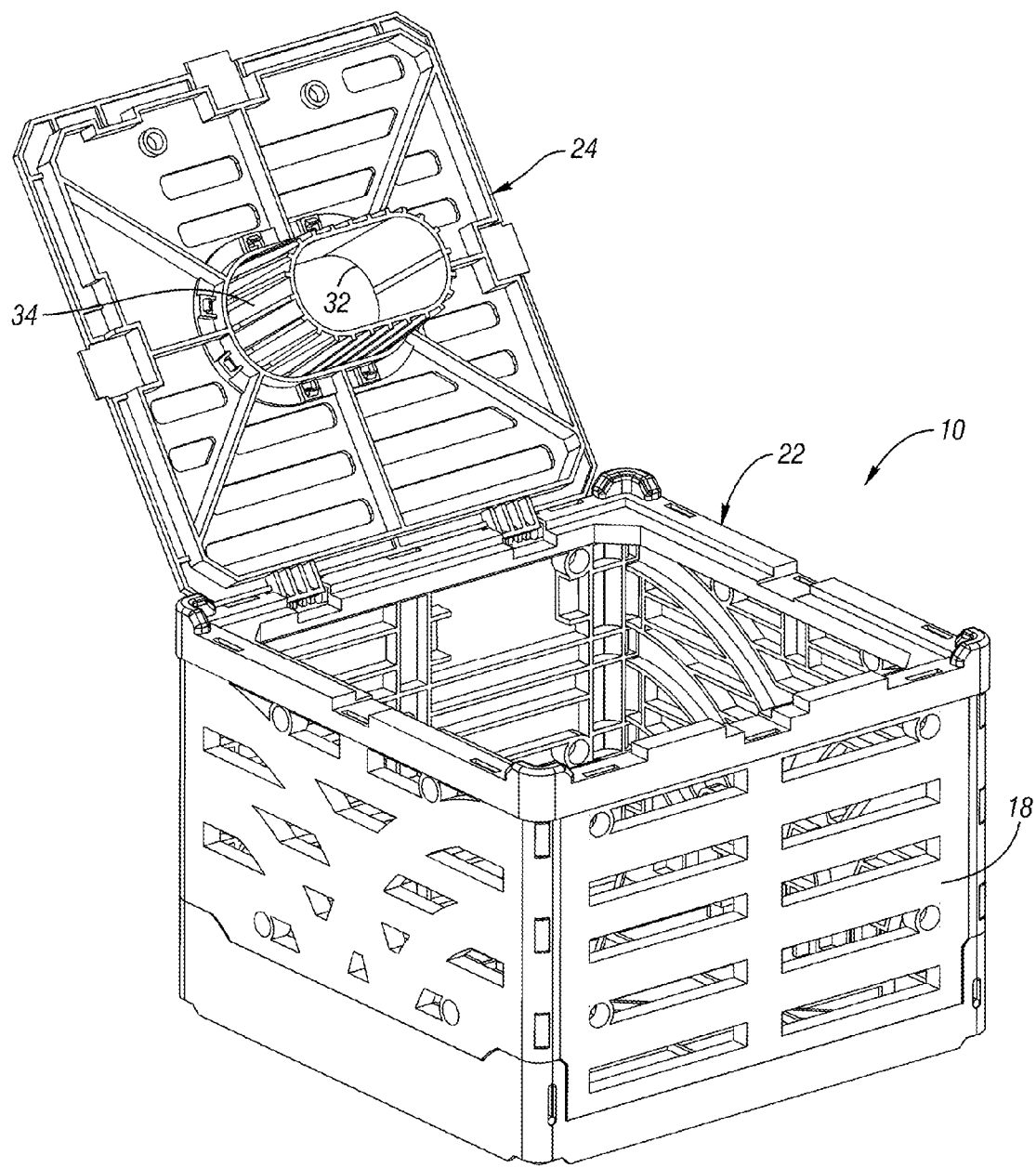
Figure 22:
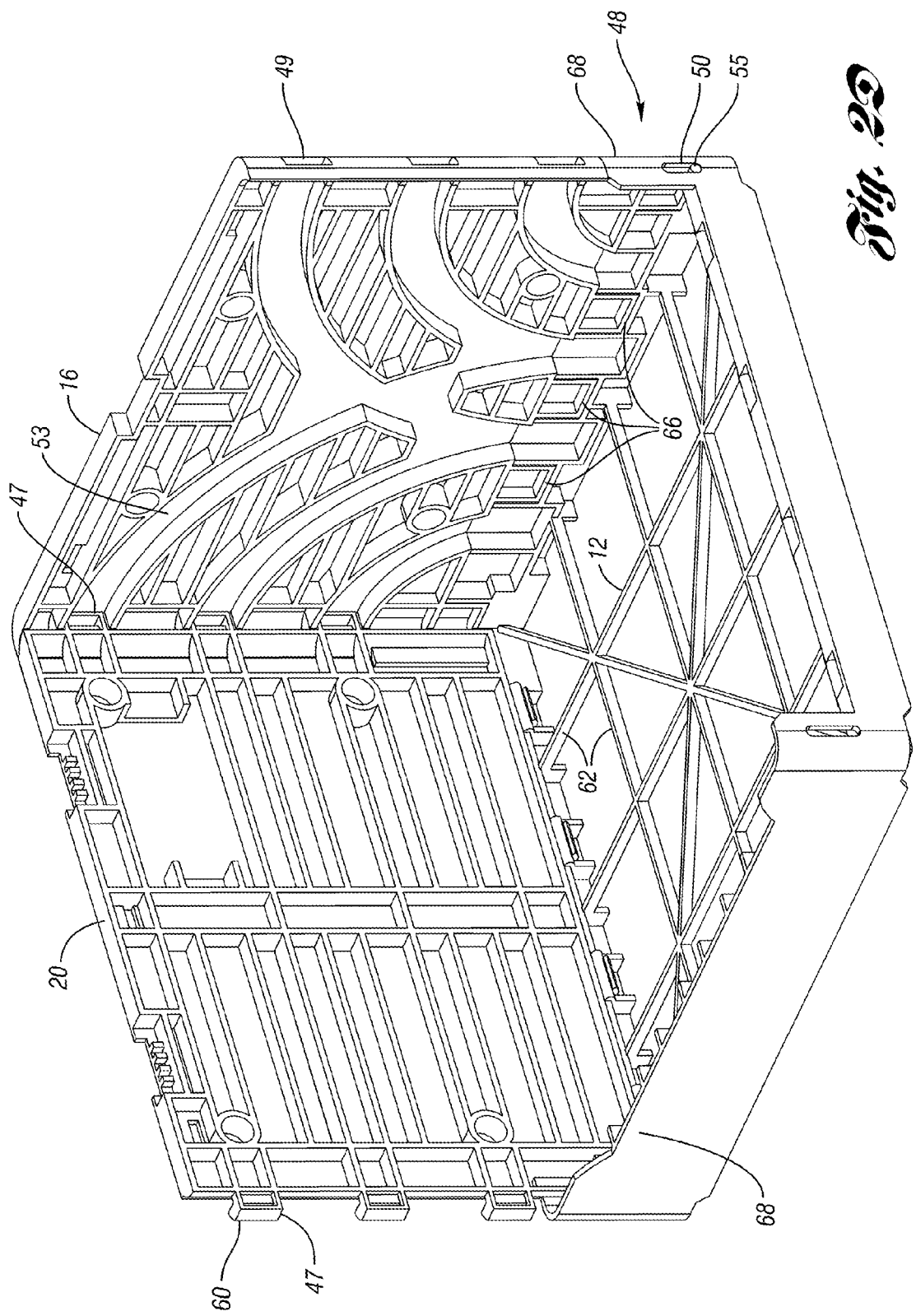

FIG. 2A is an exploded view of the top ring 22, lid 24 and walls 14, 16, 18, 20 (without the tunnel 34). The lid 24 includes a pair of integrally molded hinge pins 25. The hinge pins 25 can be inserted through openings 29 in the top ring 22 when the lid 24 is 90° relative to the top ring 22. The top ring 22 is then snapped onto the walls 14, 18, 28, 20 and pivotably traps hinge pins 25 in hinge receiver recesses 27 formed at upper edges of the end wall 20. The hinge receiver recesses 27 each include a plurality of ribs 31 that prevent the hinge pins 25 from being moved to a position where they can pass back out through the openings 29 in the top ring 22, unless the top ring 22 is removed first. The top ring 22 also protects the hinge pins 25 from any marine growth that would otherwise cause the hinge 26 to be difficult to use after time. Rotation of the lid 24 is limited by stops 33 formed in the top ring 22 adjacent the openings 29.

As shown in FIG. 2B, the hinge pin 25 is trapped by the top ring 22 in the hinge receiver recess 27 in the end wall 20. The top ring 22 acts as a clip or a retainer over the hinge pins 25, to secure the hinge pins 25 to the end wall 20.

The hinge pin 25 configuration permits the lid 24 to be opened approximately 130 degrees in the example shown in FIG. 2C. This makes the lid 24 easy to open and close with limited movement and also accounts for the movement of the boat up and down in the waves.

FIG. 2D is a perspective view of the base 12, one side wall 16 and one end wall 20. For illustration, side wall 14 and end wall 18 (FIG. 1) are not shown, but would connect similarly. As shown, each of the tongues 47 is L-shaped having a protruding portion 60 which is received in one of the openings 49 in the flange 51 of the adjacent side wall. The tongues 47 and openings 49 provide a strong tongue and groove type connection while maintaining an efficient (small) collapsed height because the flanges 51 are shallow. The flanges 51 only occupy the external vertical radius of the corner of the container 10, so it is continuous and therefore very strong. The openings 49 are positioned as close to the exterior dimensions as possible. This also makes it easy to scrape off any marine growth from the exterior of the container 10.

Base 12 includes a plurality of ribs 62 spaced upwardly from a lowermost plane of the base 12. The translating hinge 48 on the side wall 16 (side wall 14 is similar) allows the bottom of the side wall 16 to extend downward into the base 12. In particular, alternating tabs 66, each having peripheral ribs, extend downward into the base 12 inside a side flange 68 protruding upwardly from opposite sides of the base 12. The opposite side wall 14 (FIG. 2C) connects similarly.

Figure 11:
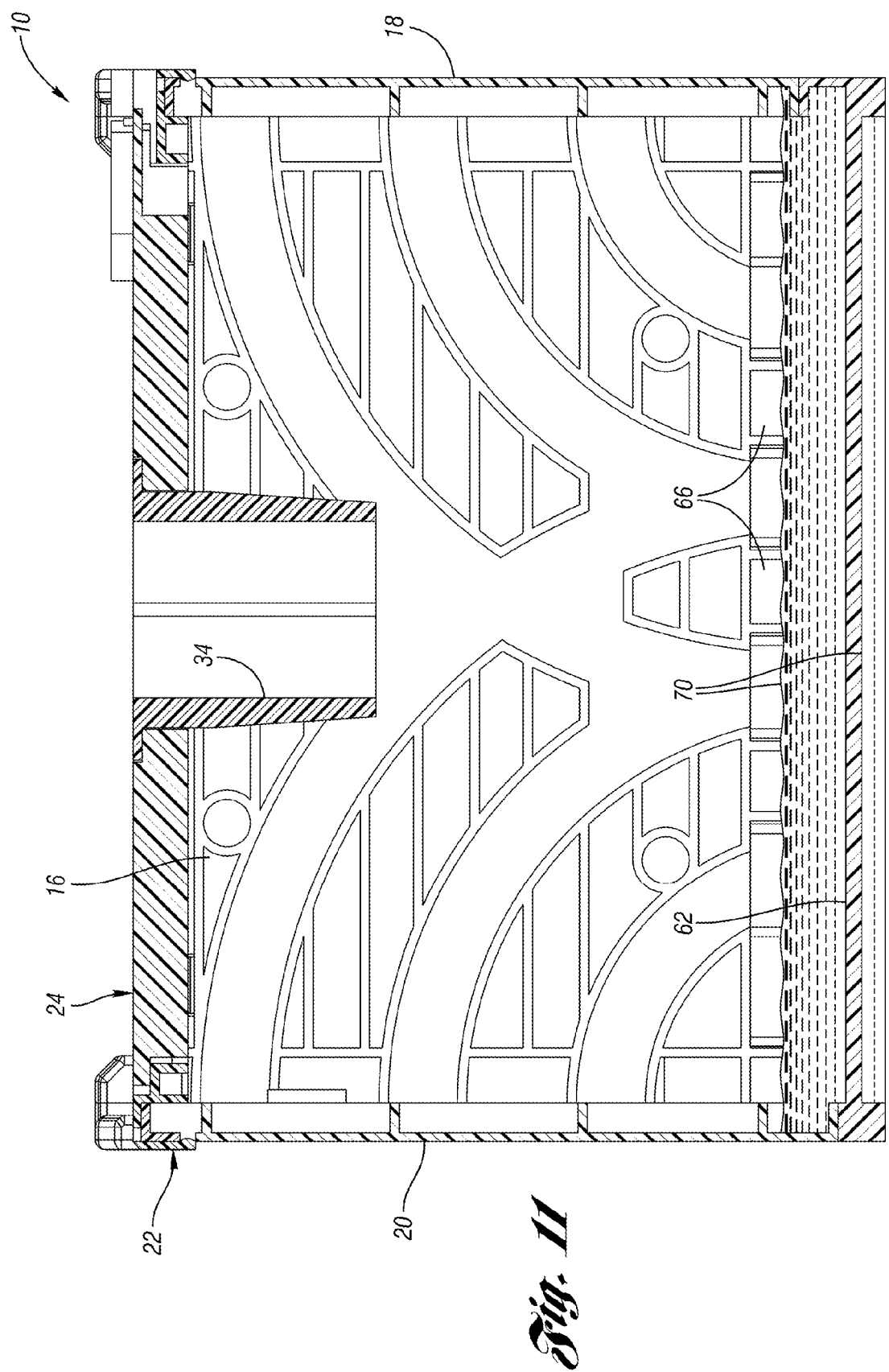
FIG. 11 illustrates the collapsible container of FIG. 2 including a weighted member.

Thus, referring to FIG. 11, a minimal amount of concrete 70 in the bottom of the container 10 will solidify and reinforce the connection of the side walls 14, 16 to the base 12. Similarly, the end walls 18, 20 have pivot axes very close to the base 12 so that a minimal amount of concrete will secure the end walls 18, 20 to the base 12. The concrete 70 fills in around the ribs of the tabs 66 of the side walls 14, 16 and the ribs of the end walls 18, 20 to help secure the walls 14, 16, 18, 20 to the base 12 and prevent them from collapsing. Also, the concrete 70 forms the floor of the container 10 and surrounds the ribs 62 in the base 12 to help secure the base 12 to the concrete and to prevent the concrete 70 from separating from the container 10 and slipping out the bottom. Of course, the concrete 70 also provides weight to the bottom of the container 10 for the purpose of maintaining its location at the bottom of the ocean (or other body of water).

Figure 4:
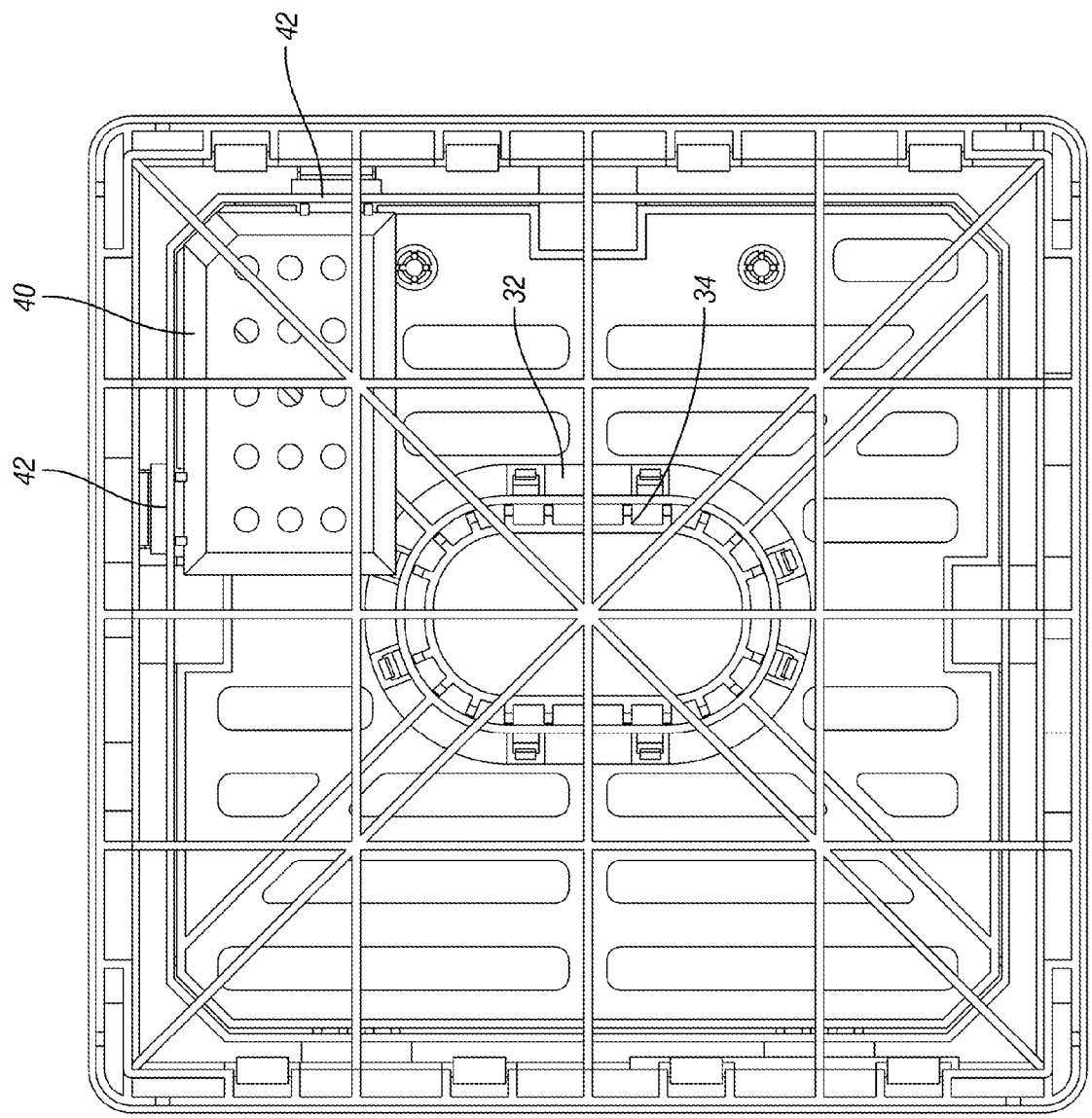
FIG. 4 illustrates a bottom view of the collapsible container illustrated in FIG. 2.

Referring to FIG. 4, the container 10 includes a bait receptacle 40 received within the interior 36. The bait receptacle 40 receives bait to lure the crustaceans into the container 10. In one example, the bait receptacle 40 is hooked onto the top ring 22 with hooks 42 and sandwiched between the top ring and the lid 24. The bait receptacle 40 may be offset from the opening 32 of the lid 24 so that the crustaceans may easily obtain entrance into the container 10.

Figure 5:
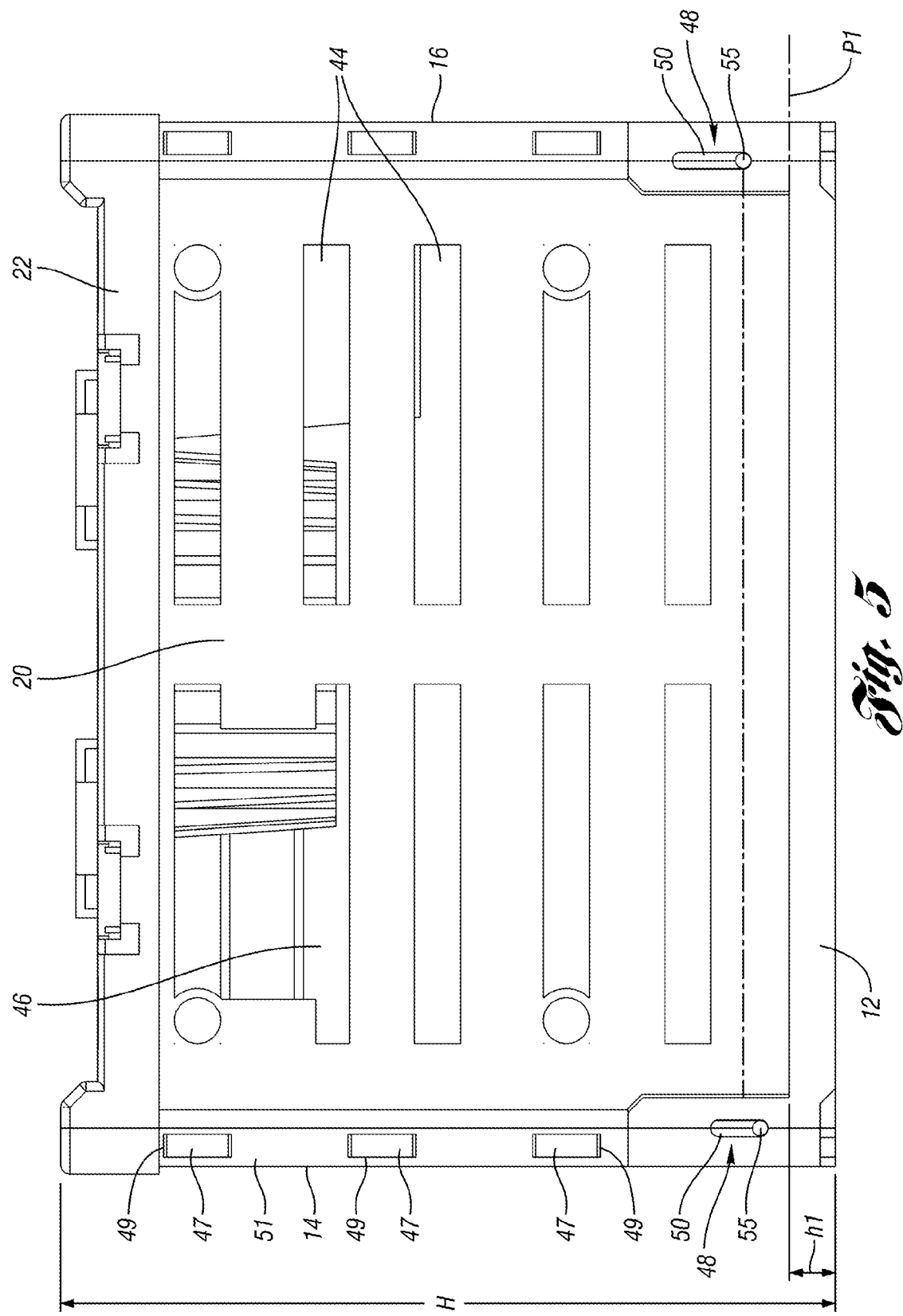
FIG. 5 illustrates a first end view of the collapsible container illustrated in FIG. 2.
Figure 6:
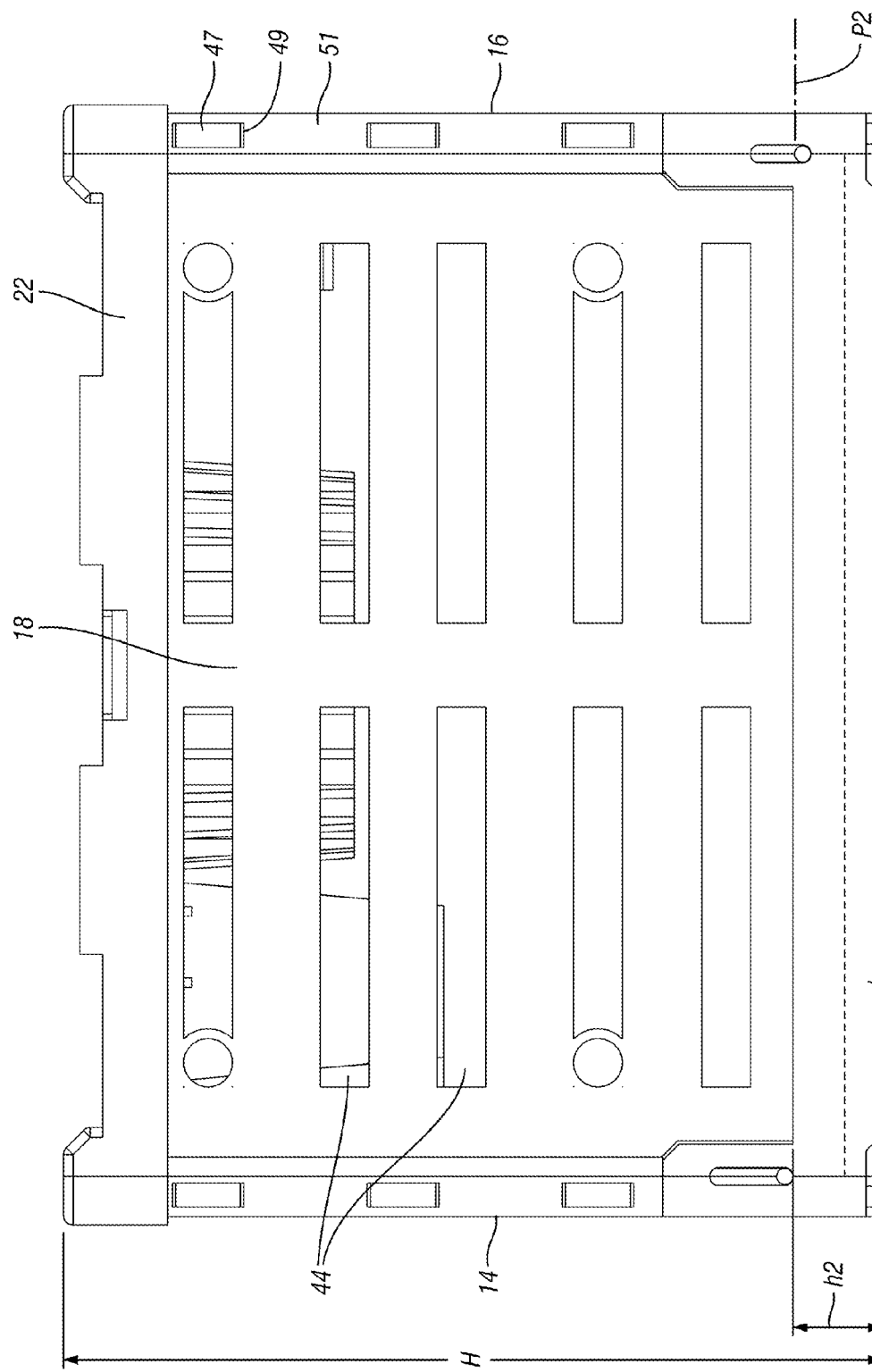
FIG. 6 illustrates another end view of the collapsible container illustrated in FIG. 2.

FIGS. 5 and 6 illustrate the end walls 20, 18 respectively, of the container 10. In the example shown, the end wall 20 is pivotable about a first pivot axis P1 (see FIG. 5) and the end wall 18 is pivotable about pivot axis P2 (see FIG. 6). Each of the end walls 18, 20 are selectively foldable inwardly across the base 12 so as to be parallel thereto. The pivot axes P1, P2 are offset from one another such that the end walls 18, 20 are parallel to one another and also parallel to the base 12 when in the collapsed position (See FIG. 12). For example, the pivot axis P1 is positioned at a first height h1 relative to an overall height H of the container 10. The pivot axis P2 is positioned at a second height h2 relative to the overall height H of the container 10. In the example shown, the height h2 is greater than the height h1 such that the end wall 18 rests on top of the end wall 20 and completely parallel thereto where folded to the collapsed position (See FIG. 12).

The end walls 18, 20 include a plurality of holes 44 that permit the passage of light and water through the container 10 subsequent to the container 10 being submerged within a body of water, such as ocean water, for example. Additionally, one of the end walls 18, 20, such as end wall 20, may include a relatively large opening, sometimes called a "chew out" opening 46 (FIG. 5) through which crustaceans may escape from the interior of the container 10. The chew out opening 46 is blocked by a water degradable material (FIG. 1), such as wood 57, when the container 10 is first submerged within a body of water. A crustacean may escape through the chew out opening 46 after the wood 57 deteriorates in the water and is chewed through by the crustacean in the event that the container 10 is unretrieved by a fisherman for an extended period of time (such as when the container 10 is lost).

Figure 7:
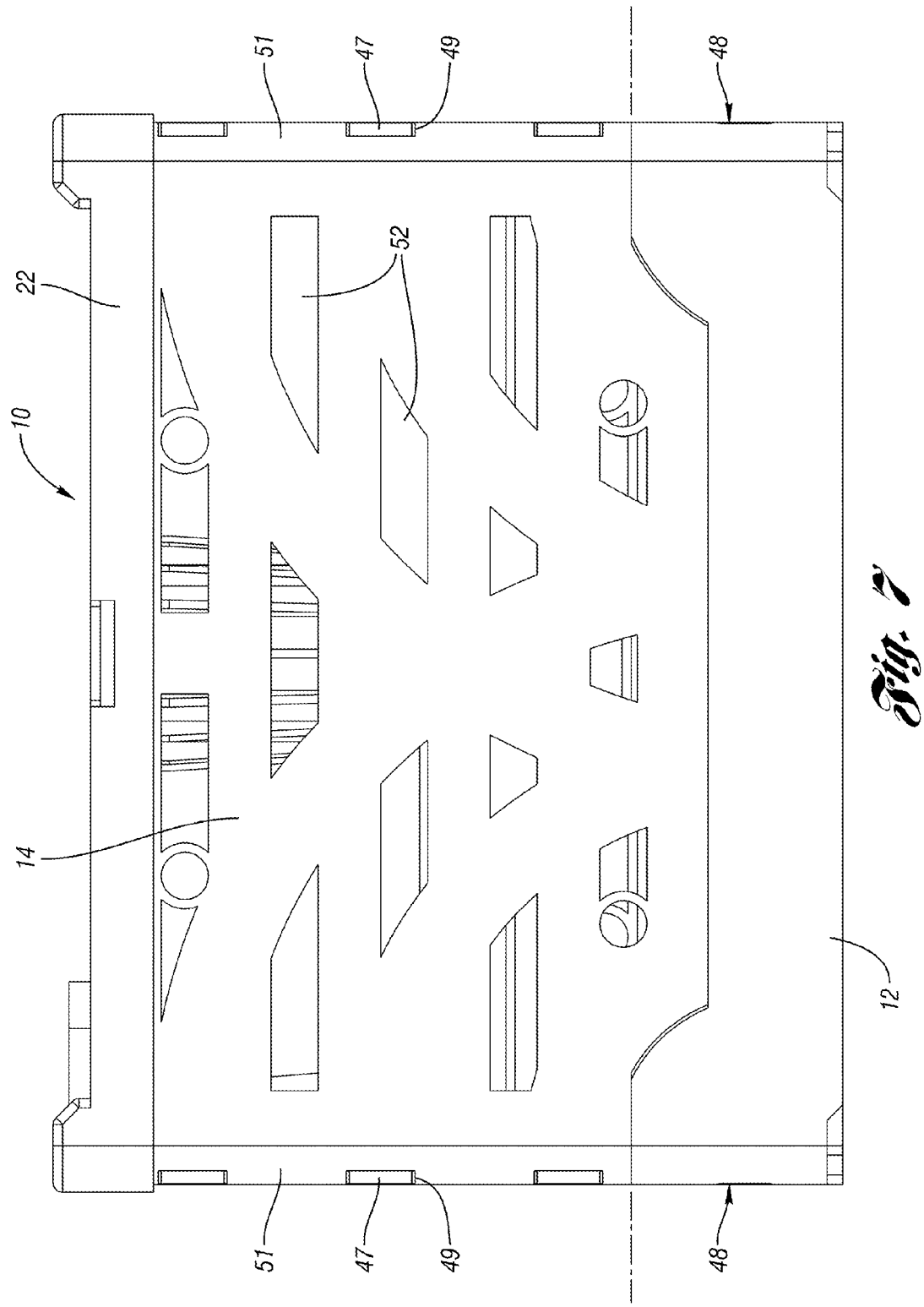
FIG. 7 illustrates a side view of the collapsible container illustrated in FIG. 2.

FIG. 7 illustrates the side wall 14 of the container 10. Although only the side wall 14 is illustrated, FIG. 7 is generally representative of both the side wall 14 and side wall 16.

Figure 8:
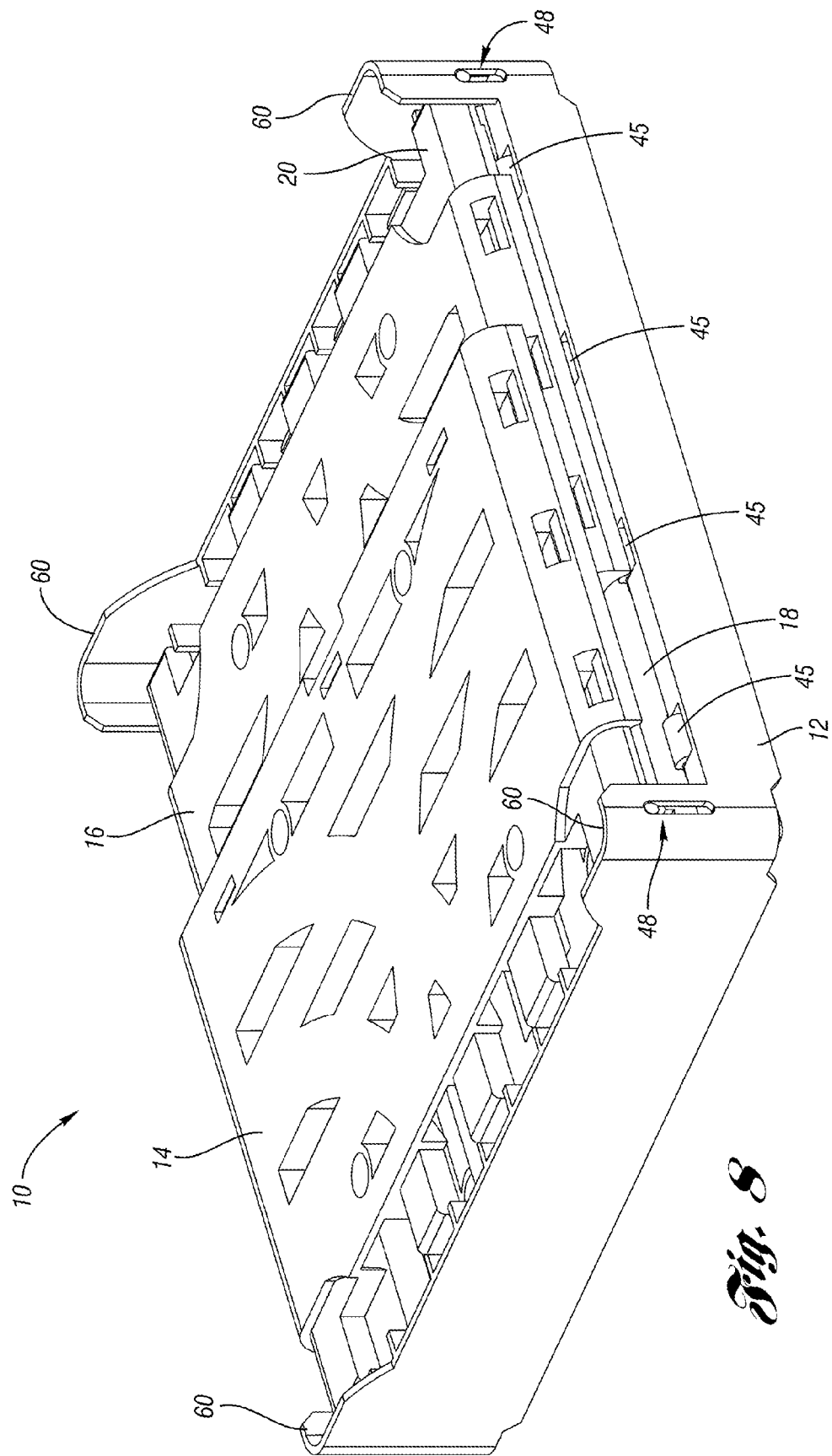
FIG. 8 illustrates the collapsible container illustrated in FIG. 2 in a collapsed position.
Figure 10:
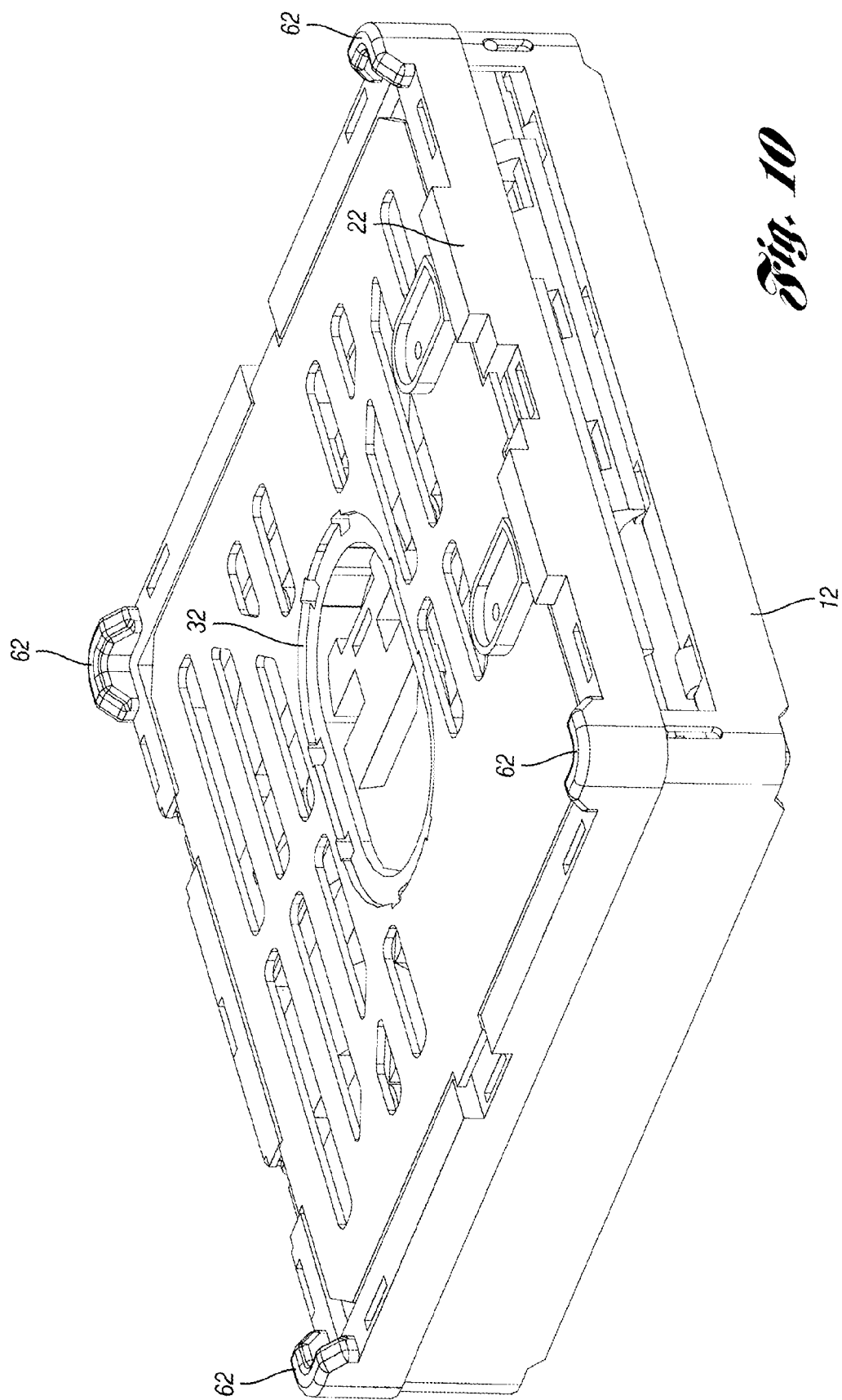
FIG. 10 illustrates the collapsible container in a collapsed position including a top ring.

FIG. 8 illustrates the container 10 in a collapsed position. Each end wall 18, 20 includes a plurality of hinges 45 for pivoting the end walls 18, 20 about the pivot axes P1, P2. When shipped, the ring 22 and lid 24 may be placed on top of the collapsed walls 14, 16, 18, 20 as shown in FIG. 10. The corner projections 60 (FIG. 8) of the base 12 are received in corresponding hollow corner projections 62 (FIG. 10) of the ring 22, thereby securely stacking the ring 22 on the base 12. The tunnel portion 34 would be sold and shipped with the rest of the container 10.

Figure 13:
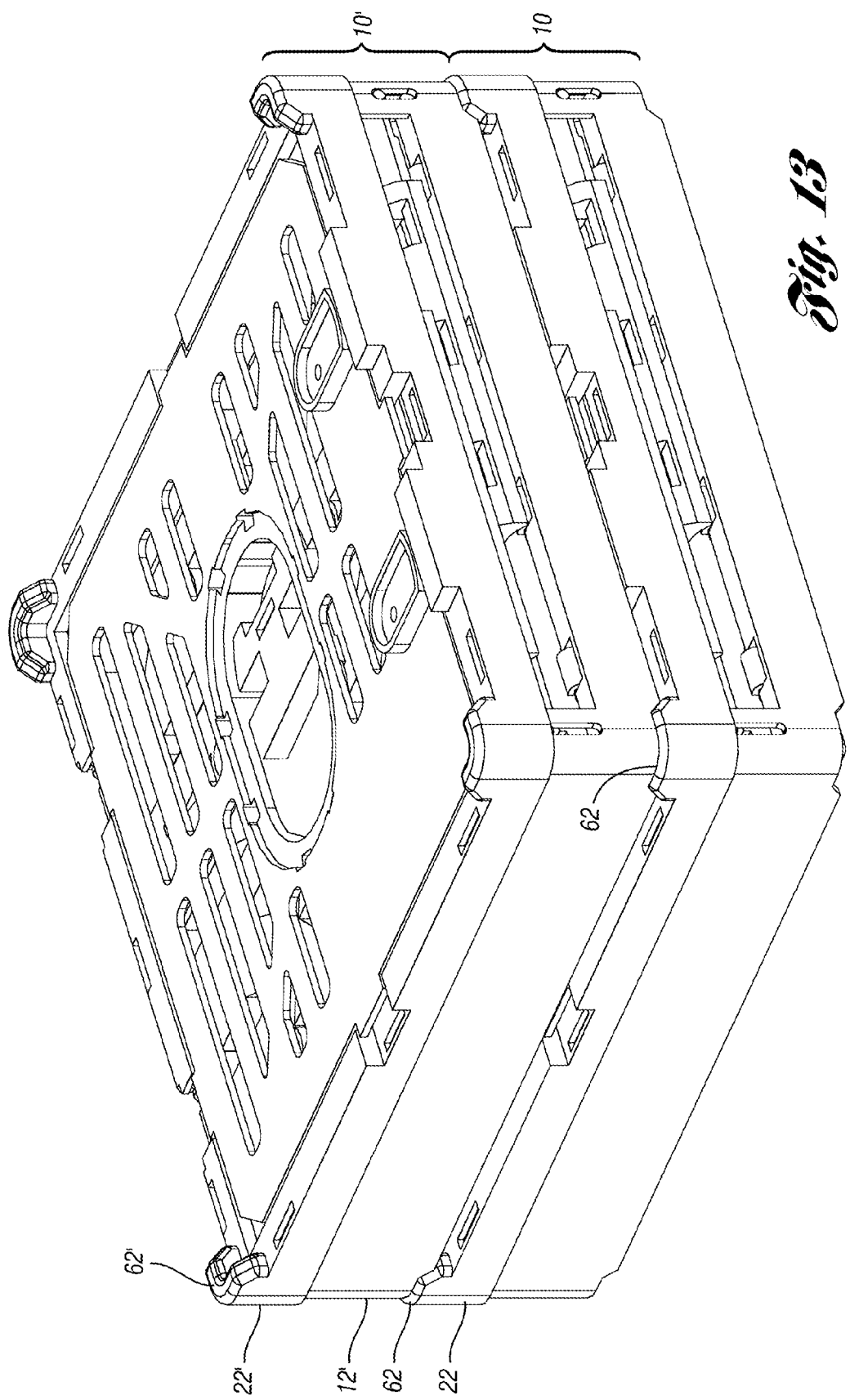
FIG. 13 illustrates the collapsed trap with a similar collapsed trap stacked thereon.
Figure 14:
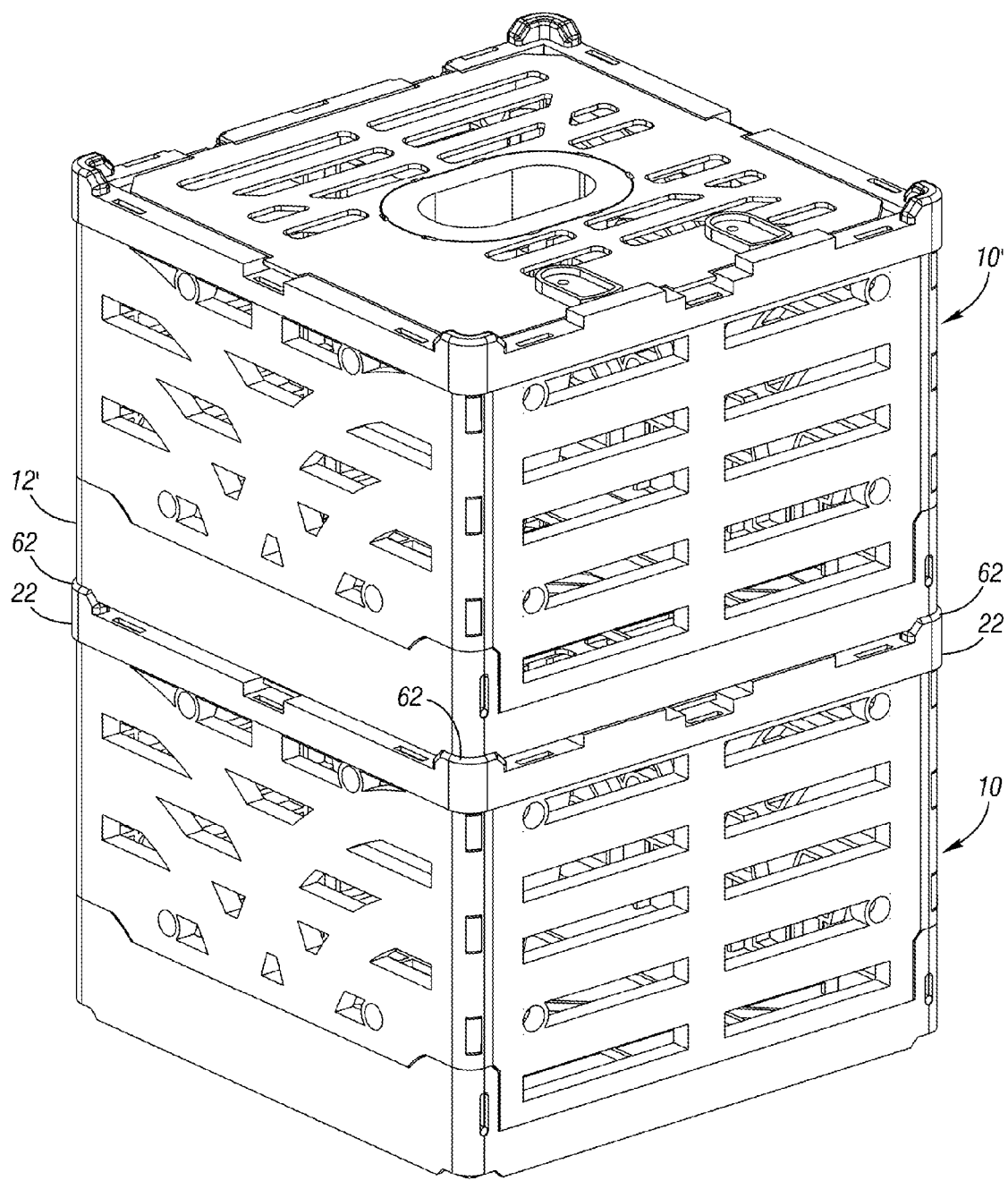
FIG. 14 illustrates the erected trap with a similar erected trap stacked thereon.

In this collapsed position, with the ring 22 and lid 24 on top, the collapsed container 10 can be stacked securely with a similar collapsed container 10', as shown in FIG. 13. The base 12' of the upper container 10' is received between the four corner projections 62 of the ring 22 of the lower container 10, so that multiple collapsed traps 10 can be stacked securely. Similarly, referring to FIG. 14, the base 12' of the upper container 10' is received within the four corner projections 62 of the ring 22 of the lower container 10 when the traps 10, 10' are assembled, so that multiple assembled traps 10, 10' can be stacked securely.

Figure 12:
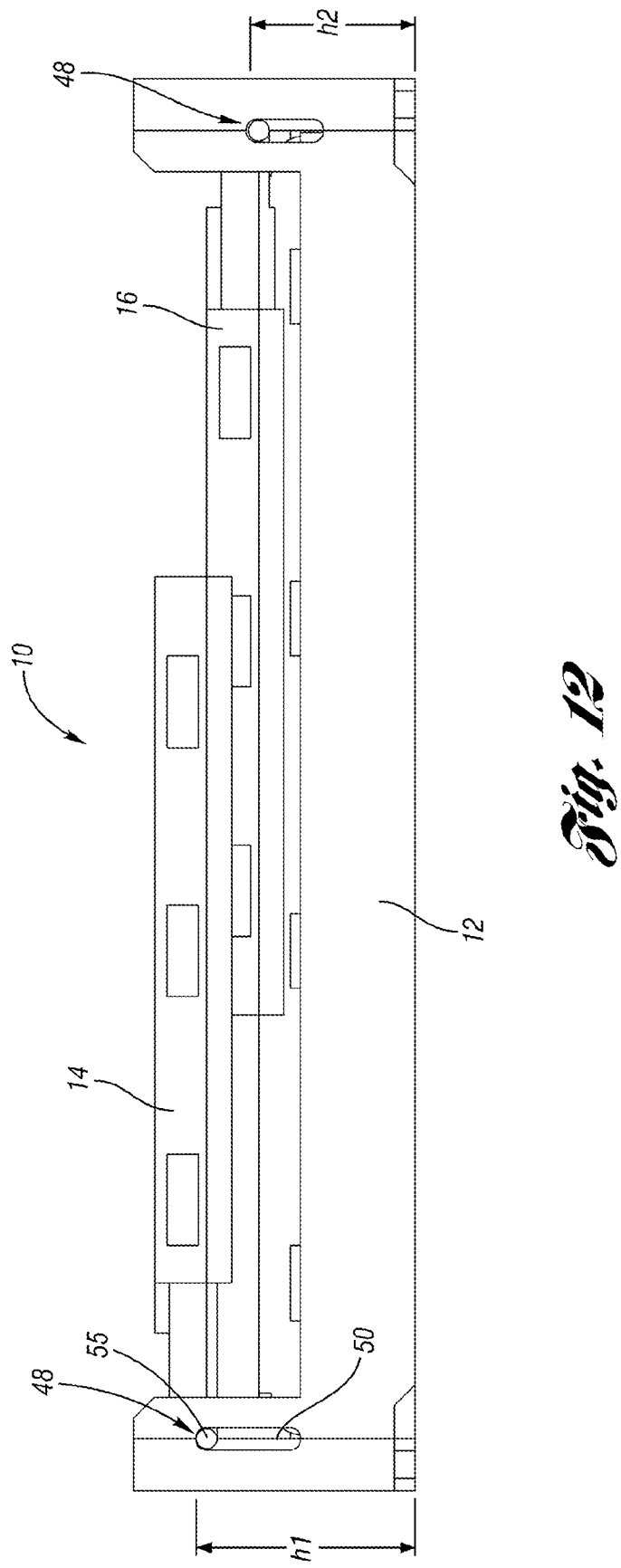
FIG. 12 illustrates a side view of the collapsible container in a collapsed position without the ring.

As illustrated in FIG. 12, when collapsed, the translating hinge arrangements 48 of the side wall 14 are positioned at a height h1 of the base 12. The translating hinge arrangements 48 of the side wall 16 are positioned at a second height h2. In FIG. 12, the height h1 is greater than the height h2 such that the side wall 14 collapses on top of the side wall 16. Therefore, the side walls 14, 16 may be collapsed onto the end walls 18, 20 and upon one another so as to be substantially parallel to the base 12, to each end wall 18, 20, and to the opposing side wall 14, 16 (see FIG. 8 for the container 10 illustrated in a collapsed position). Each of the side walls 14, 16 also includes a plurality of holes 52 for permitting the passage of light and water into the container 10.

Figure 9:
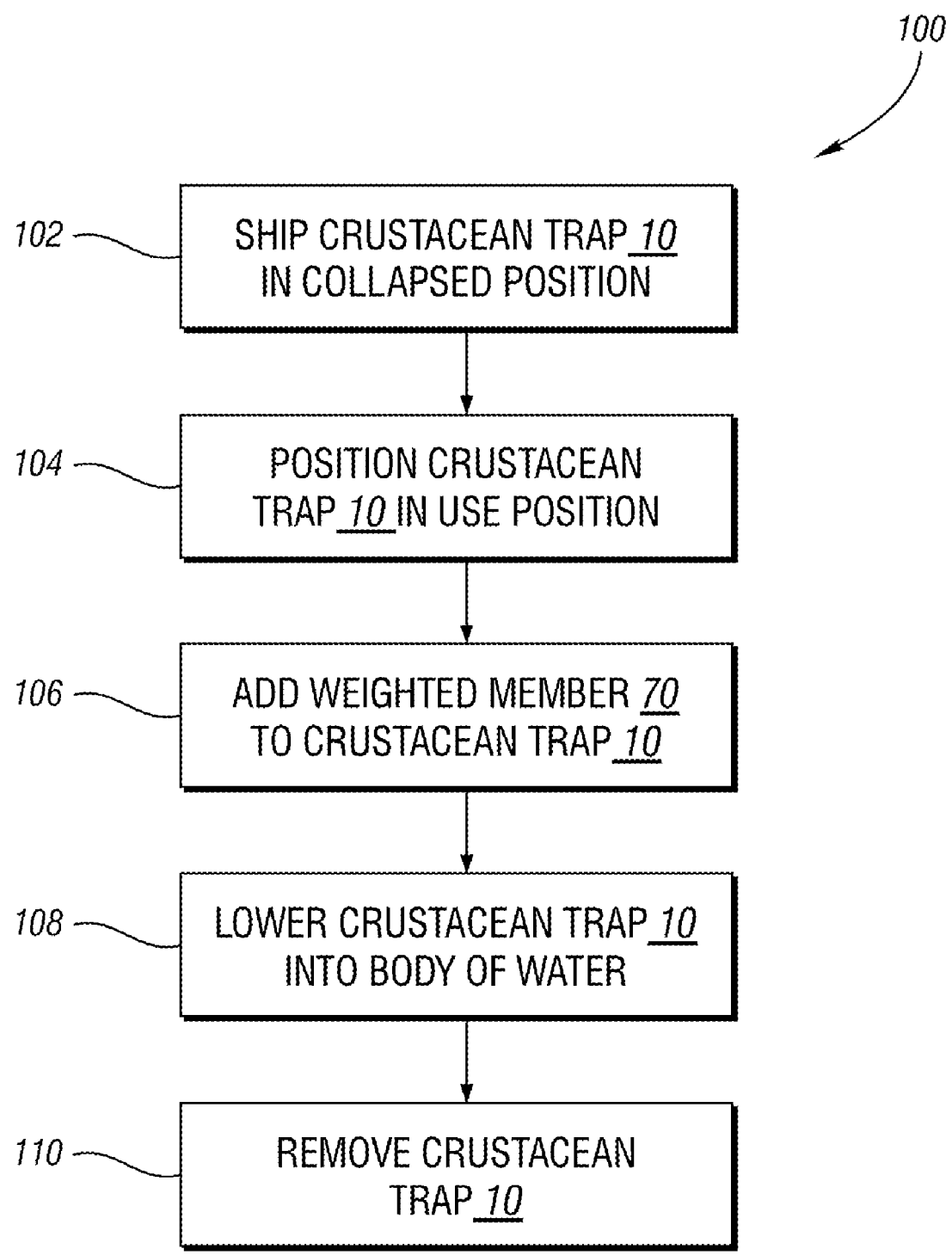
FIG. 9 illustrates an example method for of utilizing a collapsible container for trapping crustaceans.

FIG. 9 illustrates a method 100 for utilizing a collapsible container 10 to trap a crustacean. At step 102, the container 10 is shipped in a collapsed position from the manufacturing location to the warehouse, to the store and then to the end user (i.e., the fisherman). In the collapsed position, the side walls 14, 16 and the end walls 18, 20 are folded down inwardly across the base 12 so as to be essentially parallel to the base 12 and parallel to one another. Also, the top ring 22 is positioned on top of the side walls 14, 16 and the end walls 18, 20 about the outer periphery of the base 12 (see FIG. 10). In this example, the tunnel portion 34 of the opening 32 and the bait receptacle 40 are removed from the container 10. In the collapsed position illustrated in FIG. 10, the container 10 can be shipped, handled and stored in a more simple and durable manner that saves time and space as compared to prior traps.

Next, at step 104, the fisherman positions the container 10 in a use position to prepare to trap crustaceans. During this step, the fisherman pivots the side walls 14, 16 about their respective pivot axes to a position transverse to the base 12. Next, the opposing end walls 18, 20 are pivoted about their respective pivot axes to a position transverse to both the base 12 and the opposing side wall 14, 16. In one example, the end walls 18, 20 are perpendicular to the base 12 and the side walls 14, 16. The end walls 18, 20 are next interlocked with the side walls 14, 16 by translating the tongues 47 of the end walls 18, 20 within the grooves 53 and into the openings 49 of the flanges 51 of the side walls 14, 16. The top ring 22 is snap-fit onto upper ends of opposing end walls 18, 20 and the opposing side walls 14, 16. The top ring 22 rests about the trap body 15 formed by the base 12, the side walls 14, 16 and the opposing end walls 18, 20 (See FIGS. 1 and 2).

A weighted member 70 is then added to the container 10 at step 106 (See FIG. 11). The weighted member 70 is poured into the base 12 and solidifies around the ribs 62 (FIG. 2D). As one example, the weighted member 70 is concrete and the concrete is poured into the interior 36 of the container 10, where it solidifies around the ribs 62 to secure the concrete to the base 12, and where the ribs 62 may act as reinforcement to the concrete. However, it should be understood that other types or combinations of material or members that add weight to the container 10 may be positioned within the interior 36. In one example, the concrete is poured within the interior 36 and extends below the ribs 62 of the base 12 and to at least a height sufficient to partially overlap the side walls 14, 16 and end walls 18, 20. The container 10 is no longer collapsible once the weighted member 70 is added to the interior 36.

At step 108, the container 10 is lowered into a body of water for capturing crustaceans. In one example, the body of water is an ocean. However, the container 10 may be positioned within any body of water that inhabits crustaceans. Finally, at step 110, the container 10 is retrieved by the fisherman to determine whether any crustaceans have been trapped. A buoy may be attached to the container 10 to allow a fisherman to locate the container 10 upon return to retrieve the container 10 and its catch.

The foregoing description shall be interpreted as illustrative and not in any limiting sense. A worker of ordinary skill in the art would recognize that certain modifications would come within the scope of this invention. For example, although many of the inventive aspects of the container have been described above with respect to an example crustacean trap, one or more of these inventive features could be utilized alone or in combination in a container for purposes other than as a trap. For that reason, the following claims should be studied to determine the true scope and content of this invention.

What is claimed is:

1. A collapsible container comprising:
   a base;
   a plurality of walls extending upward from the base and hingeably connected thereto, the plurality of walls including a first wall having a recess proximate an upper end thereof;
   a lid having at least one hinge pin formed integrally with the lid, the at least one hinge pin received in the recess of the first wall; and
   a retainer positioned on the first wall over the at least one hinge pin to retain the at least one hinge pin pivotably in the recess.

2. The container as recited in claim 1 wherein the retainer includes an opening through which the at least one hinge pin is inserted into the recess.

3. The container of claim 2 wherein the at least one hinge pin is configured to be insertable through the opening at a first angle, but not at a second angle.

4. The container of claim 2 wherein the at least one hinge pin is not removable from the recess through the opening in the retainer when the retainer is positioned on the first wall.

5. The collapsible container of claim 1 wherein stops protruding from the retainer limit pivoting of the lid.

6. A collapsible container comprising:
   a base;

a first wall pivotably connected to the base, the first wall including a transverse flange extending transversely from an interior surface of the first wall and an arched passageway defining a groove on the interior surface of the first wall, an opening through the transverse flange adjacent an upper end of the arched passageway and positioned inwardly from the interior surface of the first wall, the transverse flange extending in a first plane and the arched passageway extending in a second plane, the first and second planes being transverse to each other; and a second wall transverse to the first wall and pivotably connected to the base, the second wall including a tongue protruding laterally therefrom, the tongue slidable in the groove as the second wall is pivoted from a collapsed position toward an upright position, the tongue including a transverse protrusion extending therefrom, the transverse protrusion received in the opening when the second wall is moved to the upright position.

7. The container of claim 6 wherein at least one of the first wall and the second wall is connected to the base by a hinge that permits vertical translation relative to the base.

8. The container of claim 6 wherein the base includes an upwardly projecting flange to which one of the first wall and the second wall is pivotably connected, wherein a portion of the one of the first wall and second wall is disposed inwardly of the upwardly projecting flange.

9. The container of claim 8 wherein the one of the first wall and the second wall includes a plurality of downwardly protruding tabs disposed inwardly of the upwardly projecting flange.

10. The container of claim 9 wherein the one of the first wall and the second wall is pivotable and vertically slidable relative to the base.

11. The container of claim 6 further including a top ring secured to an upper edge of the first wall and the second wall.

12. The container of claim 11 further including a lid hingeably connected to the top ring.

13. A collapsible container comprising:
a base;
at least one side wall and at least one end wall transverse to the at least one side wall both extending from the base;
a top ring formed separately from the at least one side wall and the at least one end wall and including a recess formed therein, the recess of the top ring receiving upper portions of the at least one side wall and the at least one end wall such that the top ring is positioned generally opposite the base;
a lid hingedly attached to the top ring; and
wherein each of the at least one side wall and the at least one end wall are each connected to the base by a respective hinge.

14. The container as recited in claim 13, further including at least one latch positioned on the lid and moveable between a locked position and an unlocked position relative to the top ring.

15. The container as recited in claim 13, further including an opening extending through the lid and including a tunnel portion that extends toward the base.

16. The container as recited in claim 13, wherein the at least one side wall includes a pair of opposing side walls and the at least one end wall includes a pair of opposing end walls, and the pair of opposing side walls, the pair of opposing end walls and the base form a container body.

17. The container as recited in claim 16, comprising a bait receptacle positioned within the container body.

18. The container as recited in claim 13, wherein the respective hinge connecting the at least one side wall to the base is a translating hinge.

19. The container as recited in claim 13, wherein each of the at least one side wall and the at least one end wall folds inwardly toward the base when moving from an upright position to a collapsed position.

20. A container comprising:
a lid pivotable between an open position and a closed position;
a container body that at least partially supports the lid and forms an interior;
a base positioned on an opposite side of the container body from the lid, the base including a plurality of ribs and a plurality of openings between the ribs, the ribs spaced upwardly from a lowermost plane of the base;
a weighted member positioned within the interior of the container body between the base and the lid; and
wherein the container body includes a pair of opposing side walls and a pair of opposing end walls transverse to the pair of opposing side walls, and wherein the pair of opposing side walls and the pair of opposing end walls are each pivotally attached to the base such that the pair of opposing side walls and the pair of opposing end walls fold inwardly toward the base when moving from an upright position to a collapsed position.

21. The container as recited in claim 20, wherein the weighted member extends to at least a height of at least one pivot axis of the pair of opposing side walls.

22. The container as recited in claim 20, wherein one of the opposing end walls is selectively pivotable about a first pivot axis and the other of the opposing end walls is selectively pivotable about a second pivot axis, and the first pivot axis and the second pivot axis are positioned at different heights relative to a height of the container body.

23. The container as recited in claim 20, wherein each of the pair of opposing side walls includes at least one translating hinge arrangement and each of the pair of opposing end walls includes at least one hinge.

24. The container as recited in claim 20, wherein the lid is pivotally attached to a top ring that is removably attached to the container body on an opposite side of the container body from the base.

25. The container as recited in claim 20, wherein the weighted member includes concrete.

26. A method of utilizing a collapsible crustacean trap to trap a crustacean, comprising the steps of:
a) receiving the collapsible crustacean trap in a collapsed position in which opposing side walls and opposing end walls, pivotably connected to a base of the crustacean trap, are generally parallel to the base and positioned on the base, and providing that one of the opposing end walls is pivotably connected to the base about an axis that is vertically offset from a pivot axis of another of the opposing end walls, the opposing end walls being shorter in length than the opposing side walls;
b) positioning the collapsible crustacean trap in a use position;
c) adding a weighted member to a portion of the collapsible crustacean trap; and
d) lowering the collapsible crustacean trap into a body of water.

27. The method as recited in claim 26, wherein the collapsible crustacean trap includes a top ring, and said step b) comprises the steps of:
pivoting the opposing side walls to a position transverse to the base;

pivoting the opposing end walls to a position transverse to each of the base and the opposing side walls; and positioning a top ring, formed separately from each of the base, the opposing side walls and the opposing end walls, on opposite ends of the opposing end walls and opposing side walls from the base.

28. The method as recited in claim 26, wherein said step c) includes the steps of:

pouring concrete into an interior of the collapsible crustacean trap to at least a height of pivoting axes of the opposing side walls of the crustacean trap, wherein the opposing side walls are pivotable relative to the base about the pivoting axes prior to said step c).

29. The method as recited in claim 26, comprising the step of:

e) retrieving the collapsible crustacean trap after a period of time.

30. The method as recited in claim 26, wherein the collapsible crustacean trap is prevented from collapsing by the weighted member subsequent to said step c).

31. The method as recited in claim 26, wherein the step of positioning the collapsible crustacean trap in the use position is performed in the absence of any further manipulation of the opposing side walls and the opposing end walls of the collapsible crustacean trap besides pivoting the opposing side walls and the opposing end walls of the collapsible crustacean trap.

32. The method as recited in claim 26, wherein a top ring and a lid are removably positioned on top of the collapsible crustacean trap in the collapsed position.

33. The method as recited in claim 32, wherein the top ring is snap fit onto the collapsible crustacean trap in the use position.

34. The method of claim 26 further including that the opposing side walls pivot and slide relative to the base during said step (b).

\* \* \* \* \*